June 13, 1933.    S. M. LLOYD    1,914,139
CONTINUITY TESTING APPARATUS
Filed Sept. 20, 1929
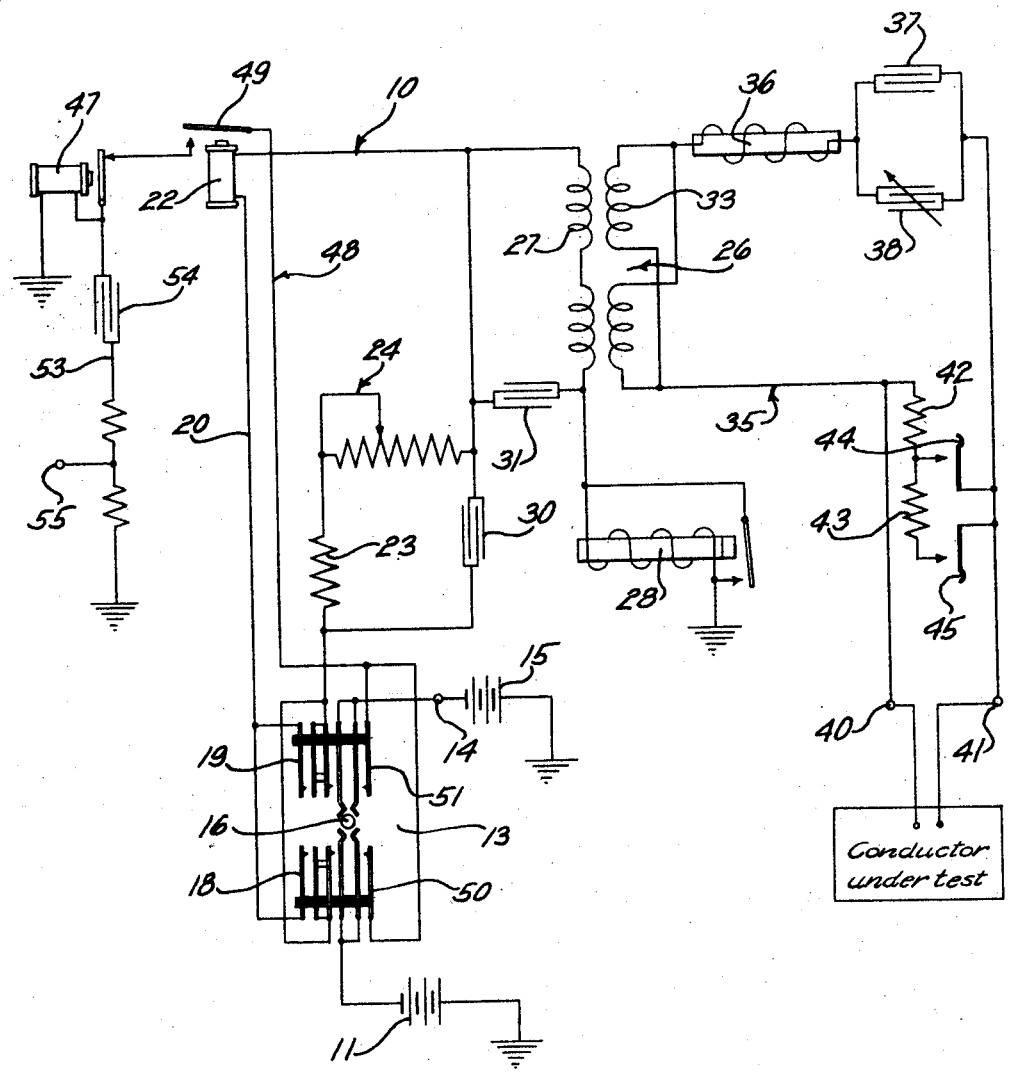
Inventor
Stanley M. Lloyd
By H. A. Lattin Att'y.

Patented June 13, 1933

1,914,139

UNITED STATES PATENT OFFICE

STANLEY M. LLOYD, OF BERGENFIELD, NEW JERSEY, ASSIGNOR TO WESTERN ELECTRIC COMPANY, INCORPORATED, OF NEW YORK, N. Y., A CORPORATION OF NEW YORK

CONTINUITY TESTING APPARATUS

Application filed September 20, 1929. Serial No. 393,881.

This invention relates to continuity testing apparatus, and more particularly to apparatus for testing the continuity of conductors employed in circuits including electrical equipment which may be easily injured.

Many types of electrical equipment, such as coils, employed in apparatus, such as telephone and radio apparatus, which are designed to operate with alternating current, may be damaged or altered by the passage of a direct current therethrough. Because of the danger of accidentally passing a direct current through such equipment it has been difficult in some instances to accurately test the continuity of conductors employed in such circuits because a direct current could not be employed except in conjunction with a high resistance voltmeter which sometimes might tend to give erroneous results. Attempts to use an alternating current tone in series with a telephone receiver have sometimes resulted in the reception of false signals.

The object of the present invention is to provide a circuit testing apparatus by means of which conductors forming parts of circuits may be accurately tested without any injury to delicate equipment included in the circuits.

One testing apparatus embodying the invention comprises a primary circuit including means for causing a pulsating current to flow therethrough, a secondary circuit in which the conductor to be tested is included, a transformer for inductively connecting the primary and secondary circuits, and a marginal relay for operating a signal when the current flowing through the portion of the primary circuit containing the relay reaches a predetermined value.

A circuit which may be employed in a testing apparatus designed to test circuits employed in telephone apparatus is shown schematically in the accompanying drawing in which the single figure comprises this circuit.

Referring now to the drawing, the numeral 10 designates a primary circuit including a source of electrical potential, such as a battery 11, the positive terminal of which is connected to the ground, and the negative terminal of which is connected to a switch 13, which as shown in the drawing comprises a double-throw switch of the tumbler key type. The battery 11 may be of any suitable type, but for testing telephone circuits it is preferably a 22½ volt battery of the type known as a "B" battery. The switch 13 has a terminal 14, to which a lead from the negative terminal of a central office battery 15 may be connected, which battery has its positive terminal connected to the ground. The switch 13 may be operated to connect either the self-contained battery 11 forming a part of the apparatus to the primary circuit 10 when the key 16 is operated downwardly, or when operated upwardly to connect the central office battery 15 forming a part of the telephone apparatus being tested to the primary circuit, depending upon the location of the apparatus being tested and the type of test being conducted. The switch 13 is provided with contact members 18 and 19, which are electrically connected to a conductor 20 leading to a direct current marginal relay 22, which is designed to operate only when currents above a predetermined value flow therethrough. Connected in parallel with the marginal relay 22 is a fixed resistance 23 and a rheostat 24, by means of which the amount of current flowing through the marginal relay 22 may be varied in accordance with the characteristics of the circuit.

A transformer 26 having its primary winding 27 in the primary circuit 10 is interposed between the marginal relay 22 and an interrupter 28, which when the switch 13 is operated serves to convert the direct current flowing from either the battery 11 or the battery 15 into a pulsating current of a predetermined frequency. In the normal operation of the device, the interrupter 28 does not require a sufficient amount of current for its operation to cause the marginal relay 22 to function.

A condenser 30 is connected in parallel with the marginal relay 22, the fixed resistance 23, and the rheostat 24 to provide a path through which the alternating component of the pulsating current may readily flow. A detailed analysis of the function of condenser 30 discloses that it acts as a storage device for the larger part of each surge of the pulsating current and discharges through the winding of relay 22 and also through the resistances 23 and 24 during the interval between each surge thereby maintaining the current through the relay much more constant than the current through the battery 11 or the battery 15. In this manner, the current passing through the winding of relay 22 is practically limited to the direct current component of the pulsating current.

Another condenser 31 is connected in parallel with the primary winding 27 of the transformer 26 to effect a tuning of the circuit so that the maximum current will flow through the transformer when a secondary winding 33 thereof is short circuited, and the minimum amount of current will flow therethrough when the secondary winding 33 is not short circuited.

The secondary winding 33 is connected in series with a secondary circuit 35, which circuit also includes a retarding coil 36, which tunes the secondary circuit to resonance at the frequency at which the interrupter 28 operates in order to prevent erroneous results caused by the circuit being brought into accidental resonance by coils and other apparatus in the circuit being tested. A fixed condenser 37 and a variable condenser 38 are also provided in the secondary circuit to assist in tuning the circuit and to prevent direct currents from flowing therethrough.

The secondary circuit 35 is provided with terminals 40 and 41, to which the ends of a conductor to be tested may be joined, and resistances 42 and 43, and testing keys 44 and 45 are provided for testing the apparatus prior to making an actual test on the conductor to be examined.

A signal of any suitable type, such as a buzzer 47, is connected in a third circuit 48, in which is connected a switch 49 controlled by the marginal relay 22, and which is connected to contacts 50 and 51 forming a part of the switch 13. Extending from the buzzer 47 is an auxiliary circuit 53 having a condenser 54 therein to prevent sparking between the contacts of the buzzer 47, and which is provided with a terminal 55, to which a lead wire from a telephone receiver (not shown) may be connected to permit an operator at a remote point to hear the buzzer 47 when it is operated.

Thus the present invention provides means for controlling the operation of the direct current marginal relay to operate a test signal by changing the characteristics of a circuit in which only an alternating current is permitted to flow.

The operation of the apparatus is as follows:

The key 16 of the switch 13 is moved downwardly to connect the battery 11 in the system, or if a central office battery, such as the battery 15, is available the key 16 may be rotated upwardly to connect this battery in the system. The interrupter 28 will then be actuated and will cause a pulsating current of a predetermined frequency to flow through the primary winding 27 of the transformer 26, the condenser 30 by-passing substantially all of the alternating current components so that for all practical purposes only direct current components of the pulsating current flow through the marginal relay 22. The testing key 44 is then operated to short circuit the secondary winding 33 of the transformer 26 through the resistance 42, which resistance is of a value equivalent to the impedance which is normally present in a conductor of the type which it is desired to test. The short-circuiting of the secondary winding of transformer 26 causes an increase of the pulsating current in the primary winding to thus increase the direct current component in the winding of marginal relay 22. The rheostat 24 is then actuated with the key 44 depressed to regulate the quantity of current flowing through the marginal relay 22 until the marginal relay operates when the key 44 is depressed. The key 44 is then released and the key 45 is depressed to connect the resistance 43 in series with the secondary winding 33 of the transformer 26. The resistance 43 is of a greater value than that normally encountered in conductors of the type being tested. The rheostat 24 is adjusted until the marginal relay 22 operates when the key 44 is depressed, but will not operate when the key 45 is depressed, when the apparatus is ready to conduct an actual test upon an unknown circuit.

In making a test the ends of the conductor to be tested are connected to the terminals 40 and 41 of the secondary circuit 35, and if the conductor being tested is a continuous one having an impedance less than or of approximately the same value as an impedance equivalent to the resistance 42, the marginal relay 22 will be actuated to close the switch 49 and cause the buzzer 47 to operate, thereby notifying the operator that the conductor being tested is satisfactory. If the conductor being tested is discontinuous or has an impedance equal to or greater than an impedance equivalent to the resistance 43, the marginal relay 22 will not operate and no signal will result.

When either the key 44 or the key 45 is depressed or a continuous conductor is connected across the terminals 40 and 41, the secondary circuit 35 forms a complete path in which an alternating current induced in the secondary winding 33 of the transformer 26 by the passage of a pulsating current through the primary winding 27 may flow, and the quantity of current flowing through the marginal relay 22 will vary in accordance with the characteristics of the resistances 42 and 43 or of the circuit being tested.

The resistances 42 and 43 may be varied in accordance with the normal characteristics of circuits of the type being tested and may be made to correspond to other characteristics of the tested circuit, such as the capacity or inductance of the tested circuits, instead of the resistance thereof. If desired the resistances 42 and 43 may be replaced by condensers or by choke coils having characteristics corresponding to those normally present in circuits of the type being tested. Other means of impressing a pulsating current upon the primary circuit 10 may also be substituted for the interrupter 28, without departing from the spirit and scope of the invention. Furthermore, other signal means, such as an electric lamp or a bell or other equivalent device, may be substituted for the buzzer 47. Or, if desired, the switch 13 may be dispensed with and the battery 11 connected directly to the conductor 20 through a single throw switch, and various other modifications may be made in the size and arrangement of the various elements without departing from the invention.

Since the current flowing through the primary circuit 10 is a pulsating current, an alternating current is induced in the secondary circuit 35 and is caused to flow through the conductor being tested which is connected to terminals 40 and 41. The condensers 37 and 38 prevent direct currents from flowing through the secondary circuit 35 and through the conductor being tested, so that any delicate equipment included in the circuit or forming a part of the conductor being tested is subjected only to alternating current and will in consequence not be damaged by the passage of a direct current therethrough during the testing operation.

Numerous experiments have shown that apparatus of the type hereinbefore described gives an accurate indication of the continuity of the conductor or circuit tested therewith, and this fact and the fact that no injury is caused to equipment included in the circuit or forming a part of the conductor being tested, renders the apparatus extremely useful in testing apparatus adapted to be used in circuits employing alternating currents, such as telephone and radio apparatus, which could not be accurately or safely tested by the methods heretofore known.

What is claimed is:

1. In a testing apparatus, a signaling device, an electric circuit, means for causing a pulsating current to flow through said circuit, a transformer having its primary winding in said circuit, a capacitance connected across said primary winding, a second electric circuit including the secondary winding of the transformer, means for connecting a conductor to be tested in the second circuit, two variable impedances adapted to be connected in said second circuit and adapted to be adjusted to the calculated maximum and minimum impedance values of said conductor and adjustable means in the first mentioned circuit for actuating the signaling device when one of the variable impedances is connected in said second circuit and for preventing the actuation of the signaling device when the other of said variable impedances is connected in said second circuit.

2. In a testing apparatus, a signaling device, an electric circuit, means for causing a pulsating current to flow through said circuit, a second electric circuit adapted to be tuned to resonance at the frequency of the pulsations in said first mentioned circuit, means for selectively connecting a conductor to be tested and impedance standards in the second circuit, means for varying the quantity of current flowing through the first mentioned circuit in accordance with the impedance characteristics of the conductor being tested or the impedance characteristics of the standards, comprising a transformer having its primary winding in shunt with a capacitance and in series with the first mentioned circuit and its secondary winding in series with the second mentioned circuit, and means for actuating the signaling device when the current in a portion of the first mentioned circuit reaches a predetermined value.

3. In a continuity testing apparatus, an electric circuit, means for impressing a direct electrical potential upon the circuit, means in the circuit for converting a direct current into a pulsating current, a signal, a direct current marginal relay in the circuit for operating the signal, and means for varying the amount of current flowing through the relay in accordance with the characteristics of a conductor being tested, said last mentioned means comprising a transformer, the primary winding of which is connected in series with said means for converting direct current into pulsating current and the secondary winding of which is connected in series with a series connection of said conductor, an inductance and an adjustable capacitance for tuning the series connection of said secondary winding, said inductance, said capacitance and said conductor to resonance at a predetermined frequency.

4. In a testing apparatus, a signaling device, an electric circuit, means for causing a pulsating current of a predetermined frequency to flow through said circuit, a transformer having its primary winding in said circuit, a second electric circuit including the secondary winding of the transformer, means for causing the second circuit to be resonant at the frequency of the pulsating current impressed on the first-mentioned circuit, means for connecting a conductor to be tested in the second circuit, and means for actuating the signaling device when the current in the first-mentioned circuit reaches a predetermined value.

5. In a continuity testing apparatus, a signaling device, an electric circuit which is resonant at a predetermined frequency, an interrupter in the circuit operable at said frequency, a marginal relay for actuating the signaling device, a rheostat for regulating the amount of current flowing through the relay in accordance with the characteristics of the circuit, and means for varying the quantity of current flowing through the relay in accordance with the characteristics of a conductor being tested.

6. In an apparatus for testing the continuity of conductors, a signaling device, a primary circuit, means for causing a pulsating current to flow through the primary circuit, a direct current marginal relay in the primary circuit for operating the signaling device, means in the primary circuit for causing the direct current component of the pulsating current to pass through the marginal relay, a secondary circuit, means for connecting a conductor to be tested in the secondary circuit, and a transformer having its primary winding in the primary circuit and its secondary winding in the secondary circuit, whereby the marginal relay will be controlled by the amount of alternating current flowing in the secondary circuit.

7. In a testing apparatus, an electric testing circuit, means for connecting a conductor to be tested in the testing circuit, a direct current indicating device in the testing circuit, means for causing a pulsating current to flow in a portion of the circuit, said last mentioned means including a direct current low voltage source and means in the circuit for causing only the alternating component of the pulsating current to pass through the conductor under test and for causing the pulsating current and its direct current component to vary in proportion to the alternating current through the conductor under test to effect the operation of the indicating device when the impedance of the conductor under test is below a predetermined value.

8. In a testing apparatus, a signaling device, an electric circuit, means for causing a pulsating current to flow through such circuit, a transformer having its primary winding in said circuit, a second electric circuit including the secondary winding of the transformer, means for causing the second circuit to be resonant at the frequency of the pulsating current impressed on the first mentioned circuit to prevent any capacitance or inductance that may be connected to the terminals of the second circuit from causing the total reactance of the second circuit including said capacitance or inductance to be less than the reactance of the second circuit when its terminals are short-circuited, and means for actuating the signaling device when the conductor connected in the second circuit has a predetermined characteristic.

9. In a testing apparatus, a primary circuit, a secondary or electric testing circuit, means for connecting a conductor to be tested in the testing circuit, a signal operating device in the primary circuit, means for causing the signal operating device to be operable only when the impedance of a conductor being tested is below a predetermined value, said last mentioned means comprising a transformer the secondary winding of which is connected in series with the conductor under test and means for tuning said conductor under test and said secondary winding to resonance at a predetermined frequency, and adjustable impedance standards adapted to be connected in said testing circuit when said conductor is removed from said circuit to determine the impedance characteristics of said conductor.

In witness whereof, I hereunto subscribe my name this 12th day of September, A. D. 1929.

STANLEY M. LLOYD.